United States Patent [19]

Beers et al.

[11] Patent Number: 5,185,811
[45] Date of Patent: Feb. 9, 1993

[54] AUTOMATED VISUAL INSPECTION OF ELECTRONIC COMPONENT LEADS PRIOR TO PLACEMENT

[75] Inventors: Gregory E. Beers, Austin, Tex.; Myron D. Flickner, San Jose, Calif.; William L. Kelly-Mahaffey; Darryl R. Polk, both of Austin, Tex.; James M. Stafford, Round Rock; Henry E. Wattenbarger, Pflugerville, both of Tex.

[73] Assignee: International Business Machines Corporation, Armonk, N.Y.

[21] Appl. No.: 825,434

[22] Filed: Jan. 21, 1992

Related U.S. Application Data

[63] Continuation of Ser. No. 634,675, Dec. 27, 1990, abandoned.

[51] Int. Cl.[5] .......................... G06K 9/00; G06K 9/46
[52] U.S. Cl. ............................................ 382/8; 382/18
[58] Field of Search ................... 382/8, 18, 22, 45, 48

[56] References Cited

U.S. PATENT DOCUMENTS

| | | | |
|---|---|---|---|
| 4,696,047 | 9/1987 | Christian et al. | 282/8 |
| 4,805,123 | 2/1989 | Specht et al. | 382/8 |
| 4,847,911 | 7/1989 | Morimoto et al. | 382/8 |
| 4,926,442 | 5/1990 | Bukowski et al. | 307/351 |
| 4,969,199 | 11/1990 | Nara | 382/8 |
| 5,023,916 | 6/1991 | Breu | 382/8 |

OTHER PUBLICATIONS

IBM Technical Disclosure Bulletin, vol. 30, No. 1, p. 228, "Surface Mounted Device Placement" Jun. 1987 USA.

IBM Technical Disclosure Bulletin, vol. 31, No. 10, p. 222, "Assembly Technique for Placing Electronic Components on Printed Circuit Wiring Patterns", Mar. 1989, USA.

IBM Technical Disclosure Bulletin, vol. 31, No. 9, p. 186, "Robotic Scanning Laser Placement, Solder and Desolder Device", Feb. 1989, USA.

*Primary Examiner*—Leo H. Boudreau
*Assistant Examiner*—Chris Kelley
*Attorney, Agent, or Firm*—Andrea P. Bryant

[57] ABSTRACT

A method and apparatus utilizing one or two cameras are described for visually inspecting a polygonal component located at the end of the robotic end effector for determining presence, position and orientation of component leads prior to placement. Image processing improvements are provided for decreasing computational complexity by representing two dimensional image areas of interest, and each containing leads along one side of a component, by one dimensional summation profiles.

4 Claims, 6 Drawing Sheets

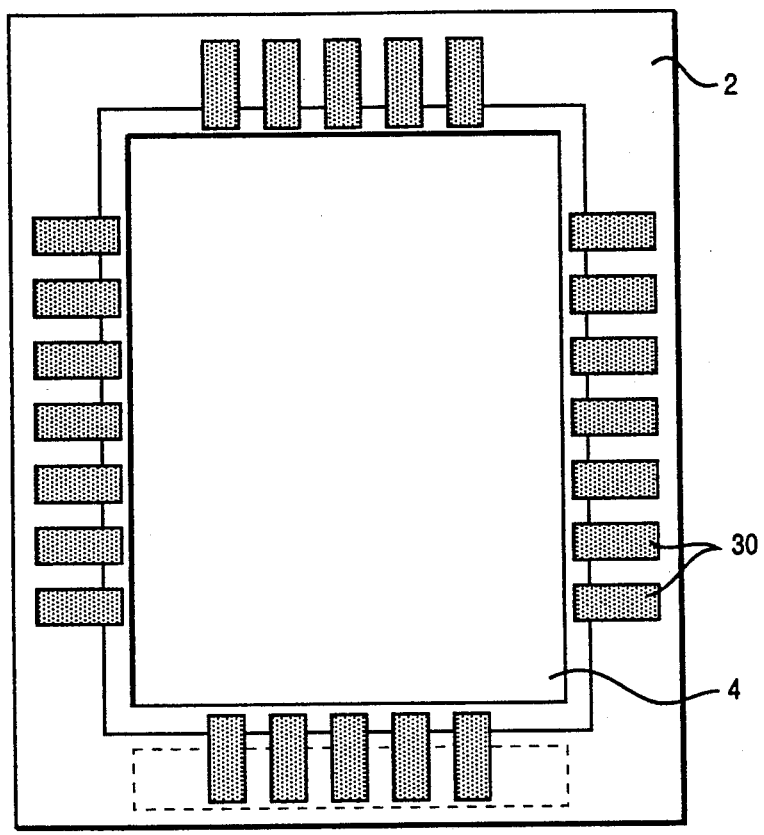
FIG. 2
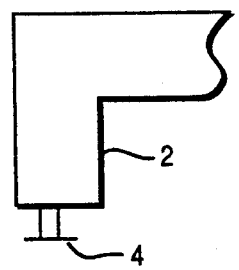
FIG. 7
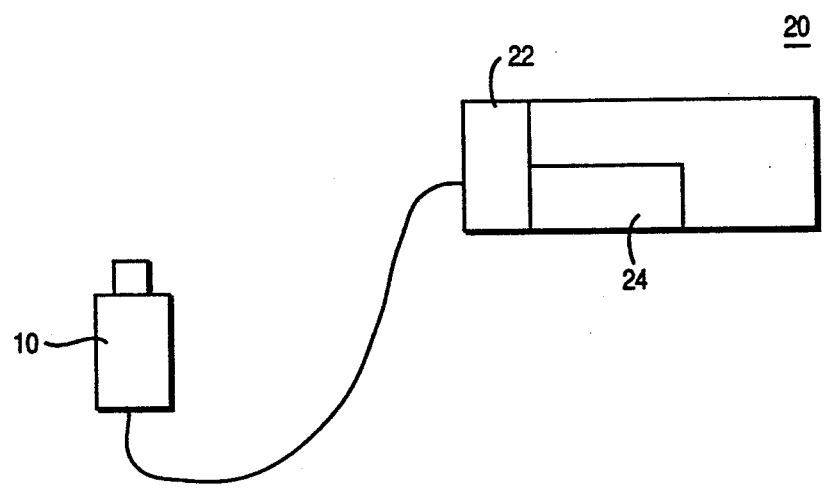

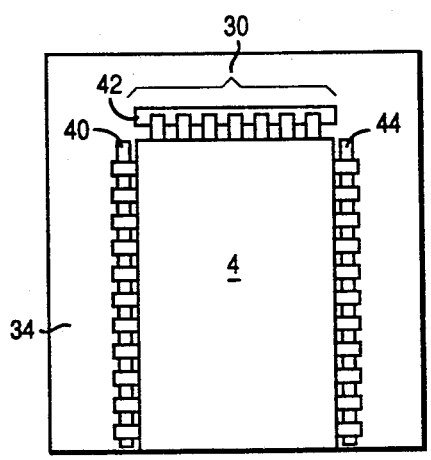
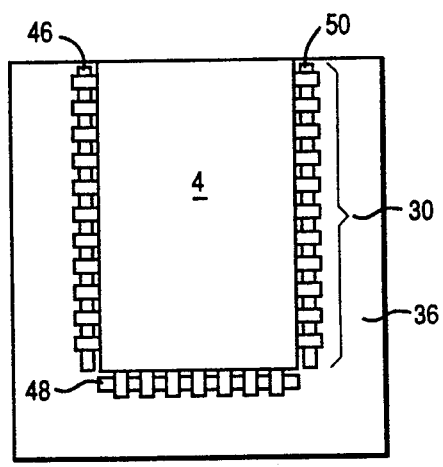
FIG. 3A    FIG. 3B
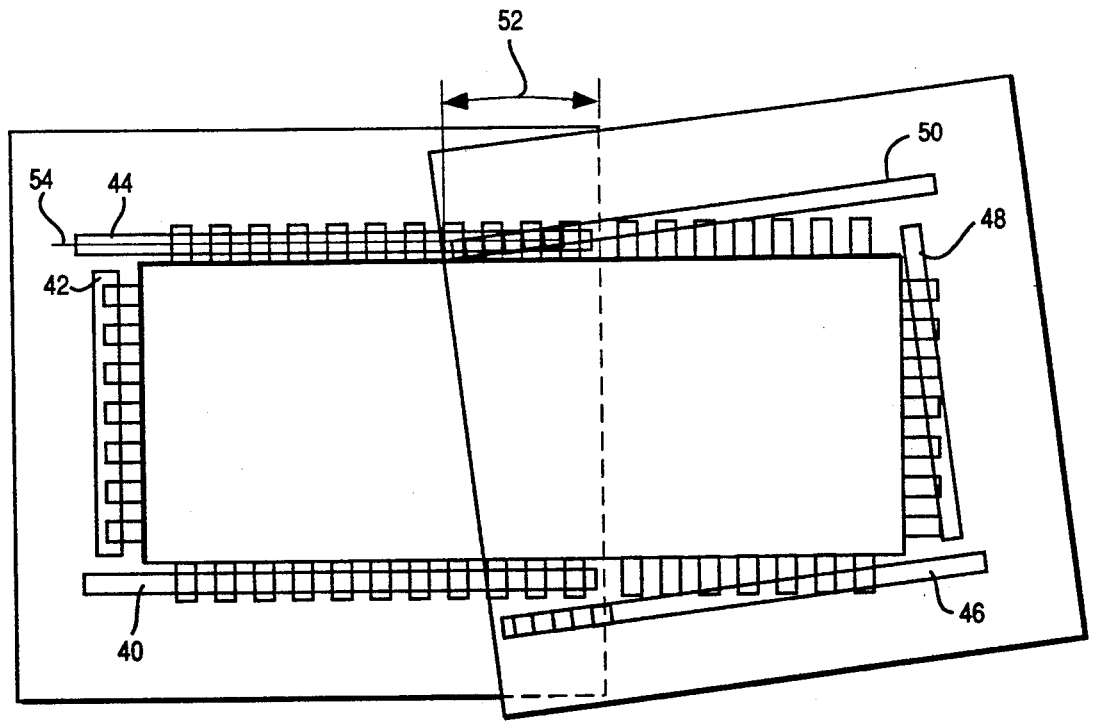
FIG. 4

AUTOMATED VISUAL INSPECTION OF ELECTRONIC COMPONENT LEADS PRIOR TO PLACEMENT

This is a continuation of application Ser. No. 07/634,675 filed Dec. 27, 1990, now abandoned.

CROSS REFERENCE TO RELATED APPLICATIONS

This application is related to commonly assigned, concurrently filed copending application Ser. No. 07/634,642, now U.S. Pat. No. 5,086,478.

BACKGROUND OF THE INVENTION

1. Field of the Invention

This invention relates to the visual inspection of electronic component leads as a step in a total placement system. More particularly, it relates to determining presence/absence, position and orientation of fine pitch leads on a surface mount component such as a TAB device located on a robotic end effector.

2. Description of the Prior Art

For high speed throughput in a automated component placement system great accuracy is required. First, the presence/absence, position and orientation of component leads must be determined. It is conventional to use computer vision techniques to aid in this determination.

The prior art has illustrated in IBM Technical Disclosure Bulletin Volume 30, Number 1, 1987, pp. 228 "Surface Mounted Device Placement" discloses a technique for inspecting a component and its leads prior to placement with a high degree of accuracy. However, it differs from the present invention in that it does not provide for the accuracy required for fine pitch components.

The principle differences resulting in less accuracy are that this reference uses only one camera and determines lead position on the basis of binary pixels rather than the additional information contained in gray level pixels.

Similarly. IBM Technical Disclosure Bulletin Volume 31, Number 10, March 1989, pp. 222 "Assembly Technique Replacing the Electronic Components on Printed Circuit Wiring Patterns" discloses the use of computer vision processing, without detail, for inspecting component lead presence, condition and orientation as a step in a total placement system.

IBM Technical Disclosure Bulletin Vol. 31, No. 9, 2/89, p. 186, *Robotic Scanning Laser Placement, Solder & Desolder Devices* discloses the use of a CCD camera and a vision and system to determine X, Y and theta offsets. Conventional CCD video cameras used in machine vision systems typically have resolution of 492 (vertical) by 512 (horizontal) pixels. Working with such a large pixel array requires time and computational resources in large amounts. It is desirable to optimize time and resource usage without sacrificing accuracy in vision processors.

SUMMARY OF THE INVENTION

The present invention improves on prior art techniques for detecting presence/absence, position and orientation of fine pitch component leads by reducing the number and complexity of vision processing operations.

The positions of leads within the image are determined by finding peaks within summation profiles taken from regions of interest i.e. where leads are expected. A summation profile is a digital integral taken along rows or columns of pixels. The sum of a brightly lit row or column of pixels which are projected by leads is higher than the projection of the relatively dark background between leads. The summation profile technique reduces the number and order of calculations required, so high speed throughput is obtained as a result of performing calculations on $N \times 1$ summation profiles rather than on $N \times N$ pixel arrays.

The inventive technique uses the coordinates of four regions of interest in the image within which leads along the top, left, bottom, and right of a rectangular component are expected to fall. Iteratively. each of the regions of interest is treated to find the position of leads on each side of the component. After leads are found on each side, the average of the positions is taken. This average, called the average centroid, represents the center position of that side of the component being inspected to sub-pixel accuracy.

The four average centroids are used to determine the center and orientation of the component. If no errors which cause processing of a component image to stop are encountered, the orientation and center of the component are used in the subsequent control of automated placement apparatus for assembling of the component on a printed circuit substrate.

In a preferred embodiment two cameras are used to produce two overlapping gray level images of a component. Two images are used to enable higher resolution. Selected portions wherein the two images leads are expected to be are mapped to a common coordinate system to facilitate subsequent determination of orientation of each selected image portion and the amount of overlap between a given selected portion and all other selected portions. Once regions corresponding to sides of the component being inspected are determined. positions of the leads are found as just indicated. In an alternative embodiment a single camera is used for initial image capture.

BRIEF DESCRIPTION OF THE DRAWING

The above and other features and advantages of the present invention will be described in connection with the following drawing wherein:

FIG. 2 is a schematic illustration of a rectangular, fine-pitch electronic component.

FIGS. 3A and 3B illustrate the images seen by cameras in FIG. 1.

FIG. 4 illustrates combining the images of FIG. 3.

FIG. 7 illustrates a modification to the system of FIG. 1.

DESCRIPTION OF THE PREFERRED EMBODIMENT

Figure 1:
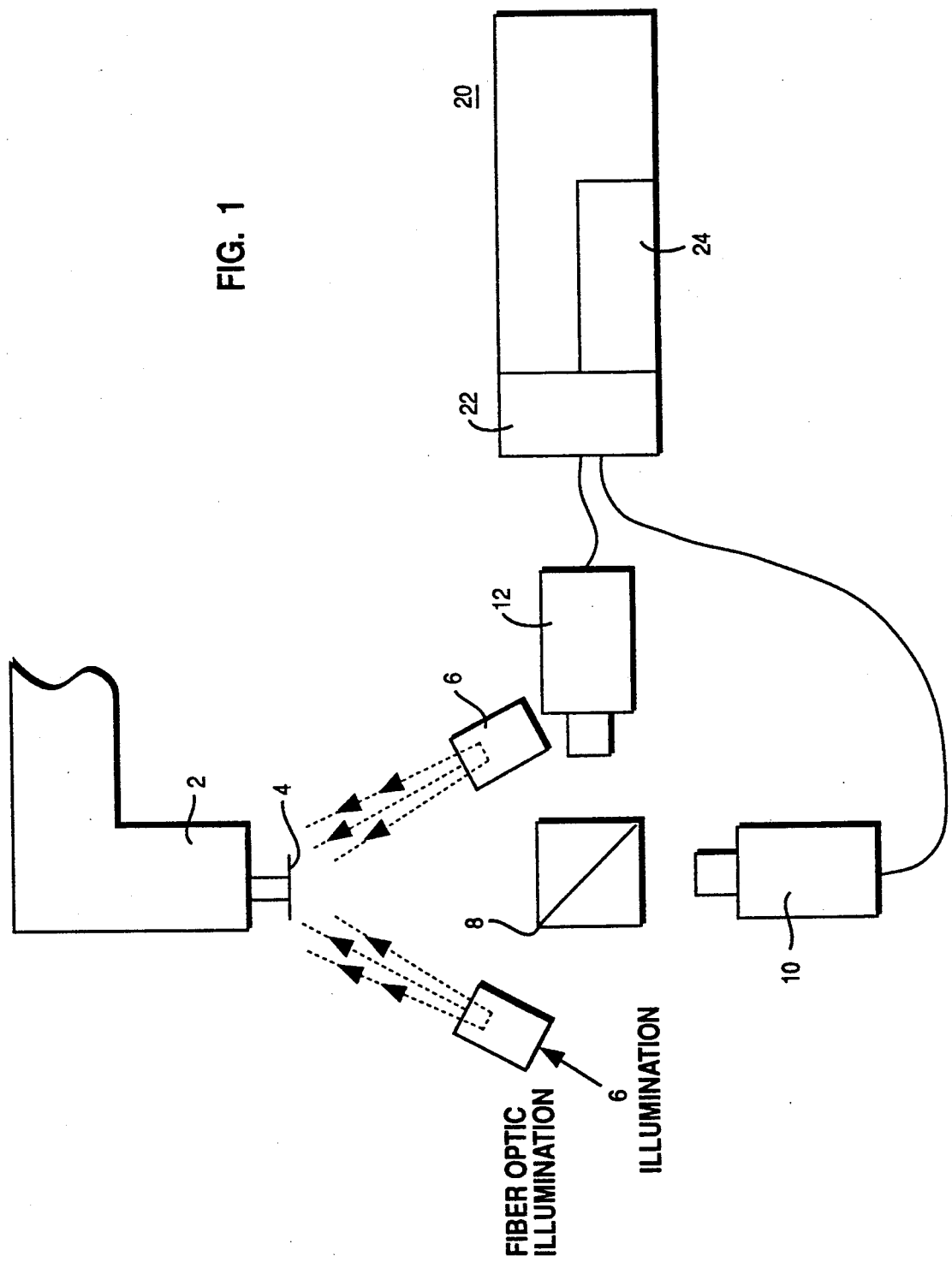
FIG. 1 is the schematic illustration of the system in which the present invention is embodied.

Refer now to FIG. 1 which schematically shows a system in which the present invention may be embodied. Robotic end effector 2 carries component 4 and positions at the inspection location. A component 4 is illuminated by light sources 6. Beam splitter 8 is interposed between component 4 and cameras 10 and 12. Cameras 10 and 12 may be CCD array sensors for detecting gray level images. Cameras 10 and 12 are in a fixed location in respect to the presentation position of the component. Image data from cameras 10 and 12 is fed into vision system 20 which includes frame grabber 22 for converting analog video signals to digital and storing same.

Vision system 20 also includes image processing logic for first retrieving and then summing subarray data.

FIG. 2 shows component 4 is carried by robotic end effector 2. FIG. 2 shows device 4 with its leads 30 viewed from beneath robotic end effector 2.

FIG. 3a shows a view of component 4 seen by camera 10 while FIG. 3b shows the view of component 4 seen by camera 12. Advantages in throughput times with the use of our invention arise primarily because less than the entire digitized camera image needs to be examined in order to complete inspection of component 4.

In FIG. 3 in view seen by camera 10, FIG. 1 is shown at 34 as including a portion of the component 4 and its leads 30. Image 34 corresponds to the two dimensional array 480×512 of pixels detected by camera 10. Similarly image 36 corresponds to the 480×512 array of pixels detected by camera 12 and includes a portion of component 4 and its leads 30. A window is a rectangular portion predefined by diagonal coordinate pairs of an image within which the search for component leads is conducted. Windows are set, predefined for each component type during systems start up. Windows 40, 42 44 in image 34 correspond to the predetermined subarray of pixels where leads 30 are expected to be. Similarly windows 46. 48. 50 referred to subarrays of pixels in image 36 where leads are expected to appear.

All windows in the two images 34. 36 are mapped to a common coordinate system. By way of example an Euler transform may be suitable. Subsequently, all computation on window coordinates is made on mapped windows. The orientation of each mapped window is determined and the amount of overlap between each mapped window and every other mapped window is calculated.

Refer now to FIG. 4. In order for two windows to overlap they must be oriented in the same direction e.g. 44 and 50. Within a set of overlapping windows, each window is paired with the window with which it has the best measure of overlap. The measure of overlap is the distance 52 windows have in common along the axis of orientation 52.

Mapped windows which are longer in the x dimension than in the y dimension are designated as being oriented from left to right and are found on the top and bottom of a rectangular component. Mapped windows which are longer in the y dimension than in the x dimension are designated as being oriented from top to bottom and are found on the left and right sides of a component.

Groups of windows are classified as falling into the classes top, left, bottom, or right of a component. A group of windows comprises one non-overlapping mapped window such as 42 or a set of two overlapping mapped windows such as 44 and 50. Groups within each class are then ordered canonically. in our preferred embodiment counter clockwise starting at top right. It is clear that other ordering may be used. This ordering in the windows in each group are used in subsequent calculations for determining the centroids of each side and amount of overlap of windows.

Once a position of the lead controls and a common coordinate system are determined and overlapping leads are compensated for, lead centroid positions are used to compute the centroid of the component and position and orientation of the component.

In this illustrative embodiment, component location is known to within 5 percent of its linear dimension. This knowledge simplifies vision system computations since only very small windows, regions of interest, in the image of a component need be examined.

In this particular embodiment, TAB components are to be visually inspected after they have been excised from a tape and their leads formed. A robotic end-effector picks up the excised and formed component and after the visual inspection is completed and coordinate corrections made, places the component on the printed circuit substrate to which it is subsequently bonded.

Coordinates of windows are fixed within the camera frame of reference.

Now, the technique for finding lead centroids. unmapped windows, will be described. A summation profile for each set of leads 30 in each unmapped window such as 42. FIG. 3 is found as follows.

Figure 5:
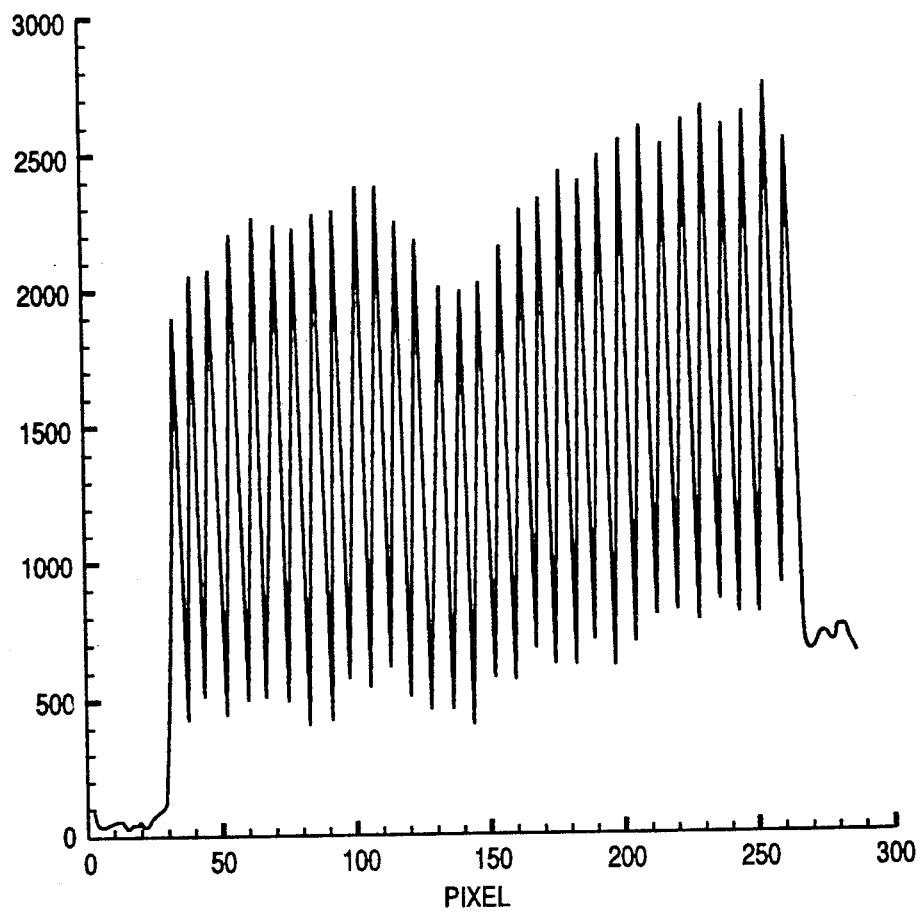
FIG. 5 graphically illustrates component lead projection.

Refer now to FIG. 5 which is a graphic representation of a summation profile for a given narrowly constrained region of interest in an image, e.g. window 42, FIG. 3. The horizontal axis represents the particular position along the component windows long axis. The vertical axis represents the digital integration or summation of the pixels oriented along the window's short axis in line with the leads.

Pixel values are summed for a given row or column. For summation profiles to accurately reflect the position of leads, the axis of each lead must be approximately parallel to the line of summation. Thus summation profiles are sums of gray level pixel values in rows or columns of two dimensional arrays as a function of the expected orientation of leads on a side of the component. Because the width of summation windows is small, the affects of non-orthogonality of image axis and lead axis is diminished. If orientation of a component does not vary by more than 2.5 degrees, it is safe to assume that any error introduced by non orthogonality is insignificant.

The material of end-effector 2 (FIG. 1) is such that the leads appear as brightly reflected features against a darker background. This aspect of the illustrative system further reduces required computation time since the background is not specular.

The centers of the leads correspond to peaks 90. 92 in the summation profile shown in FIG. 5. First differences, i.e. derivatives, of the sums are found. Peaks in the summation profile occur at a first difference transition from plus to minus. Valleys 94,96 occur at transitions from − to +. Some of the peaks correspond to lead centers. The centers of the leads cannot be found by looking for the edges of leads because there is insufficient data to clearly distinguish the edges of the individual leads. The leads are so close together that the summation profiles form Gaussian distributions with peaks at the centers of the leads.

Light gradients are corrected by subtracting summation valleys from adjoining peaks. Corrected peak values obtained in this manner are less variable since surfaces corresponding to peaks receive approximately the same amount of incident light from illumination sources 6, FIG. 1 as the surfaces corresponding to adjoining valleys.

The lead positions in the two images from cameras 10 and 12 in FIG. 3 are then mapped to a common coordinate space using the same Euler transform as above described with respect to windows 40, 42, 44 46, 48, and 50 in FIG. 3. Mapping only lead centroids rather than the entire image avoids a huge computational expense.

It is necessary to determine overlap between leads and overlapping windows for each group. Two leads are deemed overlapping if their proximity is less than that which can be attributed to errors in calibration and initial estimates of position in image space. If the number of leads found after correction for overlap is not that expected and no leads are determined to be missing, then a check of calibration accuracy is required. Further the absence of overlapping leads within overlapping windows indicates a need for a calibration accuracy check.

The exclusion of false leads is enhanced as noise peaks of the corrected peak values are excluded by ignoring all peaks below an empirically determined minimum. Thus, false leads are prevented from appearing where a missing lead might be. From the peaks remaining in a region of interest after noise suppression, a group is selected for which all of the peaks are 0.75 to 1.25 pitch distance from their nearest neighboring peaks. For any given component placement operation nominal pitch and lead size are known. In addition, the number of peaks in the group must be at least the number of expected leads. Hence, missing or bent lead detection is indicated by absence of an acceptable group of peaks. False leads at either end of a selected group are eliminated by discarding corrected peaks until the two peaks at either end are within a normal range of corrected summation values of the other peaks in the groups.

This method is successful since a region of interest. i.e. a window is only 5 percent larger than the length of a group of leads. Thus, there is little room in which false peaks can appear. Even fewer false peaks occur in a selected group since "good", true, peaks are required to occur at the distance of one pitch from their nearest neighboring corrected peak. The ratio of true leads to false leads in a selected group is therefore high. A group of true leads produces corrected summation peaks varying little from each other in their values, while the corrected summation peak for a false lead noticeably differs from those of true peaks.

Since the ratio of true peaks to false leads is high, measures of the first and second moments of a selected group of leads will be most reflective of true leads and so false leads may be excluded using these measures.

Figure 6:
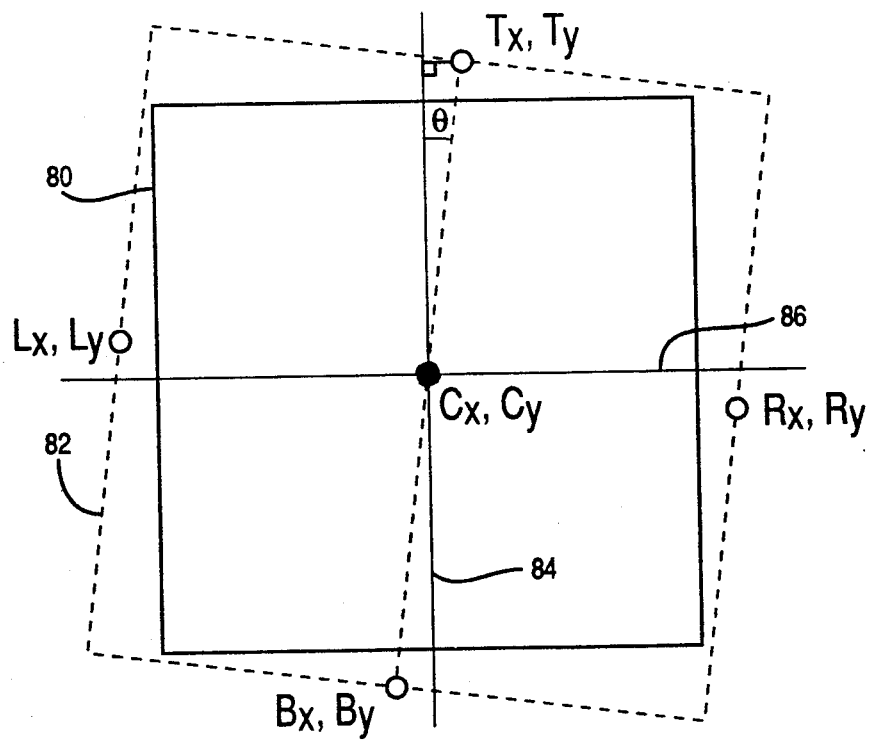
FIG. 6 illustrates the determination of component center and orientation.

The determination of component center to sub pixel accuracy will now be described having reference to FIG. 6 which schematically shows against reference outline 80 an outline 82 representing image frame of reference. The average lead centroids are indicated at T, R, B, L on component 4, outline 82. Coordinates of the average lead centroids are (TX, TY), (RX, RY), (BX, BY) and (LX, LY). The coordinates of the center (XY, CY), of component 4 are found by averaging the centroids of the sides.

$CX$ = the absolute value of $(TX-BX)/2$ $CY$ = the absolute value of $(LY-RY)/2$ The orientation of component 4 as the angle theta between image axes 84, 86 and the T−B and L−R axes of component 4. The angle theta is calculated in accordance with the following:

$$\text{Theta} = \arcsin((CX-TX)/(TY-CY)) = ((LY-CY)/(LX-CX))$$

There follows below a Pseudo code description of the logic comprising the inspection technique of the present invention.

```
Block Subroutine Hierarchy:
Block 0: Examine a component
Block 1: Find centers of leads
Block 1A: Correct for light gradients
Block 1B: Select a group of corrected
peaks.
Block 1B1: Find all the groups
whose peaks are pitch
distance apart.
Block 1B2: Choose one of the
groups
Block 1C: Iteratively exclude peaks
from either end of the group
Block 1C1: Remove peaks
Block 2: Find average centroid
Block 3: Find position and orientation
Block 0: Examine a Component:
Iteratively examine each region of interest on
each of the four sides of a component:
Block 1: Find centers of leads in the
region of interest.
if no errors encountered in Block 1:
then
Block 2: Find average centroid of
leads in the region of
interest.
if no errors have been found in any of the four
sides of a component
then
Block 3: Find position and orientation of
the component
if no errors found
then
Use the position and orientation of the
component to place it.
else
Reject the component.
Block 1: Find Centers of Leads:
If the region of interest is oriented vertically:
then
form the summation profile by summing rows
of pixels from the top of the region of
interest to the bottom.
else the region of interest is oriented horizontally:
form the summation profile by summing
columns of pixels from the left side of the
region of interest to the right side.
Find first differences of the sums in the summation profile.
Using the first differences. find the peaks and
valleys in the summation profile:
Some of the peaks correspond to the centers
of the leads.
Block 1A: Correct for light gradients by
subtracting adjacent valleys from
peaks, the result of which are corrected peaks.
Exclude corrected peaks whose average per
pixel value is < an empirically derived
minimum.
if number of corrected peaks left in the
region of interest < expected number of
leads
then
return Error: WRONG NUMBER OF LEADS
else the number of correct peaks is at least
the number of expected leads:
Block 1B: Select a group of corrected
peaks for which:
```

-continued

* all of the peaks are 0.75 to 1.25
pitch from their nearest neighbor-
ing peaks.
* The number of peaks in the group
is at least the number of expected
peaks.
if errors encountered in Block 1B:
then
return errors
else a group of corrected peaks has
been selected by Block 1B:
Block 1C:
Iteratively exclude peaks
from either end of the group
until:
The two end peaks are
within a normal range of
values of the other
peaks in the group
or
The number of peaks
remaining 9n the group
is = the expected number
of leads.
return any errors encountered in Block
1C.
if no errors encountered:
then
the remaining peaks in the selected group
correspond to the centers of leads in this
region of interest.
Block 1A: Correct for light Gradients:
There is only one valley next to the last peak:
Reset the last peak summation valley to:
peak summation value - valley summation
value
Iteratively treat all peaks except the last:
There are two valleys on either side of a
peak:
val1 = peak summation value - first
valley summation value
val2 = peak summation value - second
valley summation value
The least non-negative of val1 and the val2
is the best correction for a potential light
gradient:
if val1 < val2
then
reset the peak summation value to
val1
else
if val2 is non-negative
then
reset the peak summation
value to val2
else
reset the peak summation
value to zero
else val2 < val1:
if val2 is non-negative
then
reset the peak summation
value to val2
else
if val1 is non-negative
then
reset the peak summation
else
reset the peak qummation
value to zero
Block 1B: Select a Group of Corrected Peaks:
In what follows:
group number is the index to groups
group (group number) is the group whose
index is group number
number of peaks (group number) is the number
of peaks in the set group (group number)
Block 1B1: Find all the groups in the region
of interest for which:
* all of the peaks in the group are
0.75 to 1.25 of the pitch from
their nearest neighboring peaks.

if there are too many groups:
then
return Error: TOO MANY GROUPS.
(probably the expected pitch
is incorrect.)
else
Block 1B2: Choose one group from the groups
found.
return errors found in Block 1B2.
Block 1B1: Find all the Groups Whose Peaks are Pitch
Distance Apart:
Group number = 0
Assign the first peak to group [0]
Iteratively examine all peaks in the region of
interest except the last:
At the ith iteration:
gap = absolute value of:
position of peak at ith position -
position of peak at ith + 1 position
if (gap < 1.25*pitch) and (gap >
.075*pitch):
assign the peak at position i + 1 to
group [group number]
else gap separates the ith + 1 peak from the
last group:
increment group number by 1
if group number < maximum number of
groups:
then
assign the peak at position i + 1 to
group [group number]
else
return Error: TOO MANY GROUPS.
(probably the
expected pitch is
incorrect.)
Block 1B2: Choose One Group:
Iteratively examine groups:
(I.E. for all group number. 0 <= group number
<=n, where n is the number of groups)
Select all groups for which:
number of peaks [group number] >=
expected number of leads.
if there exists more than one group for which:
for all group numbers 0 to n:
number of peaks [group number] >= expected
number of leads.
then
return Error: The REGION of INTEREST is
MUCH LARGER THAN it NEED be.
else
if there exist no groups for which:
for all group number 0 to n:
number of peaks [group number] >=
expected number of leads.
then
return Error: WRONG NUMBER of LEADS.
else only one group selected:
Remove all peaks from the region of
interest which are not in the selected
group.
Block 1C: Iteratively Exclude Peaks From Either End
of the Group:
In what follows:
group [i] is the ith peak in array of peaks
which form the group.
group [0] is the first peak and group [n] is
the last peak in the array of peaks.
pos(group[i]) is the position within the
summation profile of group[i]
sum(pos(group[i])) is the corrected summa-
tion value at pos(group[i])
Measure average and standard deviation of cor-
rected summation values at positions of peaks in
the group
while (number of peaks in group > expected number
of leads)
and
(sum(pos(group[0])) or sum(pos(group[n]))
are outside the normal range of values of
the other peaks in group):

```
-continued

Set maximum difference = average + fac-
tor*standard deviation
Block 1C1: Remove peaks which are outside
the maximum difference.
if (number peaks in group > expected number
of leads)
and
(peaks have been removed from the group
since the average and standard deviation
have been measured last):
then
Measure average and standard deviation
of corrected summation values at
positions of peaks in the group
if (number peaks in group > expected number of
leads)
return Error: WRONG NUMBER of LEADS
Block 1C1: Remove Peaks:
remove peaks at the beginning of the array group:
while (absolute value(sum(pos(group[0])) -
average) maximum difference)
and
(number peaks in group > expected number of
leads):
Iteratively for all i, 1 < =i < =n:
group[i-1] = group[i]
n = n - 1
peaks at the end of the array group:
while (absolute value(sum(pos(group[n])) -
average) > maximum difference)
and
(number peaks in group > expected number of
leads):
n = n - 1
Block 2: Find Average Centroid:
The average centroid of this region of interest
to sub-pixel accuracy is the average of the
centers of all the leads in the region of inter-
est.
if distance between the middle lead position and
the average centroid position is not within an
acceptable range
then
return Error: in the REGION of INTEREST
MEASUREMENTS:
Probably a missing or bent lead
if the number of leads found is not = the number
of leads expected
then
return Error: WRONG NUMBER of LEADS:
Leads overlooked or leads
missing or bent
Block 3: Find Position and Orientation:
Use the four average centroids found to:
* find the center of the component
* find the horizontal and vertical angles
of orientnation
if the absolute value of:
the difference between the horizontal and
vertical angles > a maximum
then
return Error: in ANGLE MEASUREMENTS:
One or more of the average
centroid measurements are in
error probably due to inclu-
sion of (a) false leads(s).
```

Those having skill in the art will understand that the system of FIG. 1 may be modified as shown in FIG. 7 to have a single camera. Such a modification is useful when less than the high resolution provided by the system of FIG. 1 is required or when a single camera can provide the high resolution required.

In this embodiment, camera 10 snaps a picture of component 4 in frame grabber 22, reads into memory the array of pixels detected by camera 10 such that pixel values are stored. Subarrays corresponding to the areas where leads are expected to appear are predefined as earlier described having reference in the system of FIG. 1. Summation profiles are performed as discussed having reference to FIG. 5. Corrections for light gradients are performed in the same manner and noise peaks are excluded as earlier described.

Further, while we have described the use of a certain type camera, it should be understood that any kind of image acquisition digitizing apparatus is suitable for use with our invention.

Figure 8A:
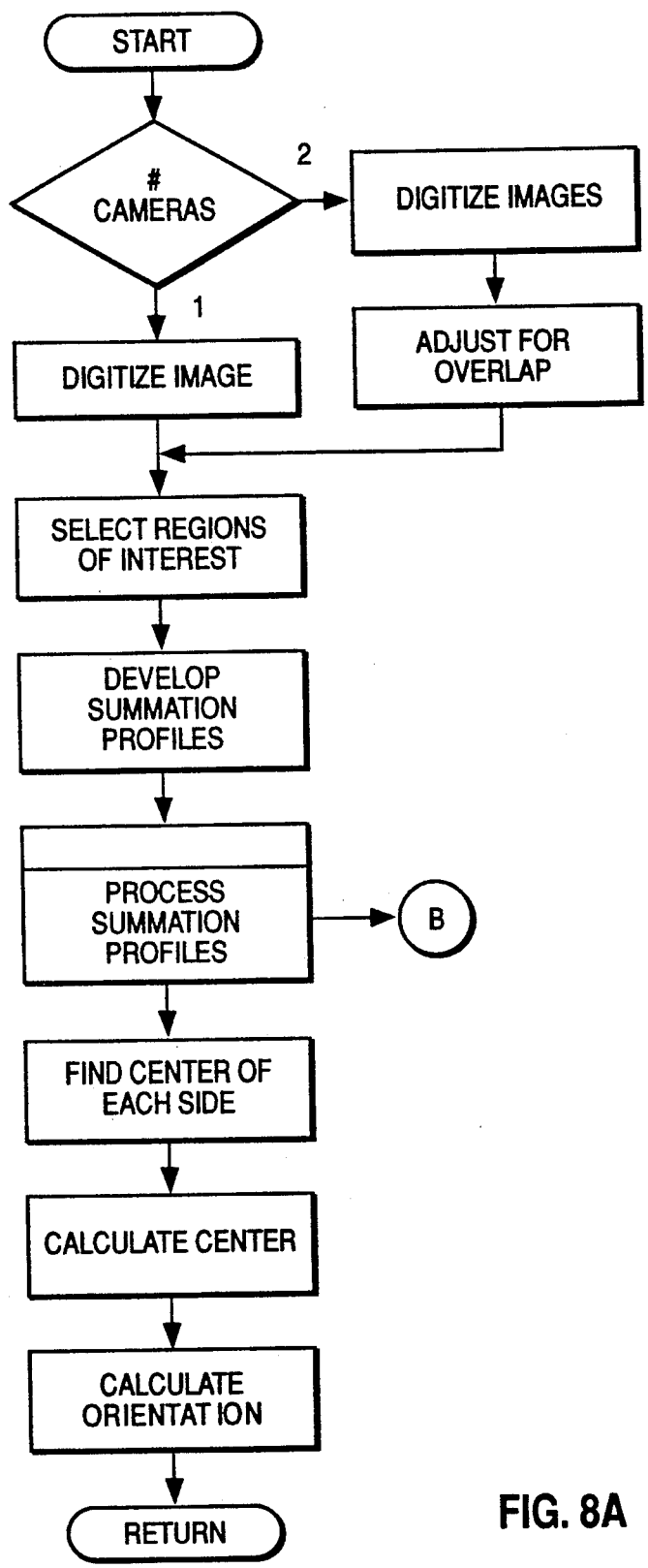
FIGS. 8A and 8B are flow charts illustrating the logic executed in vision system 20.
Figure 8B:
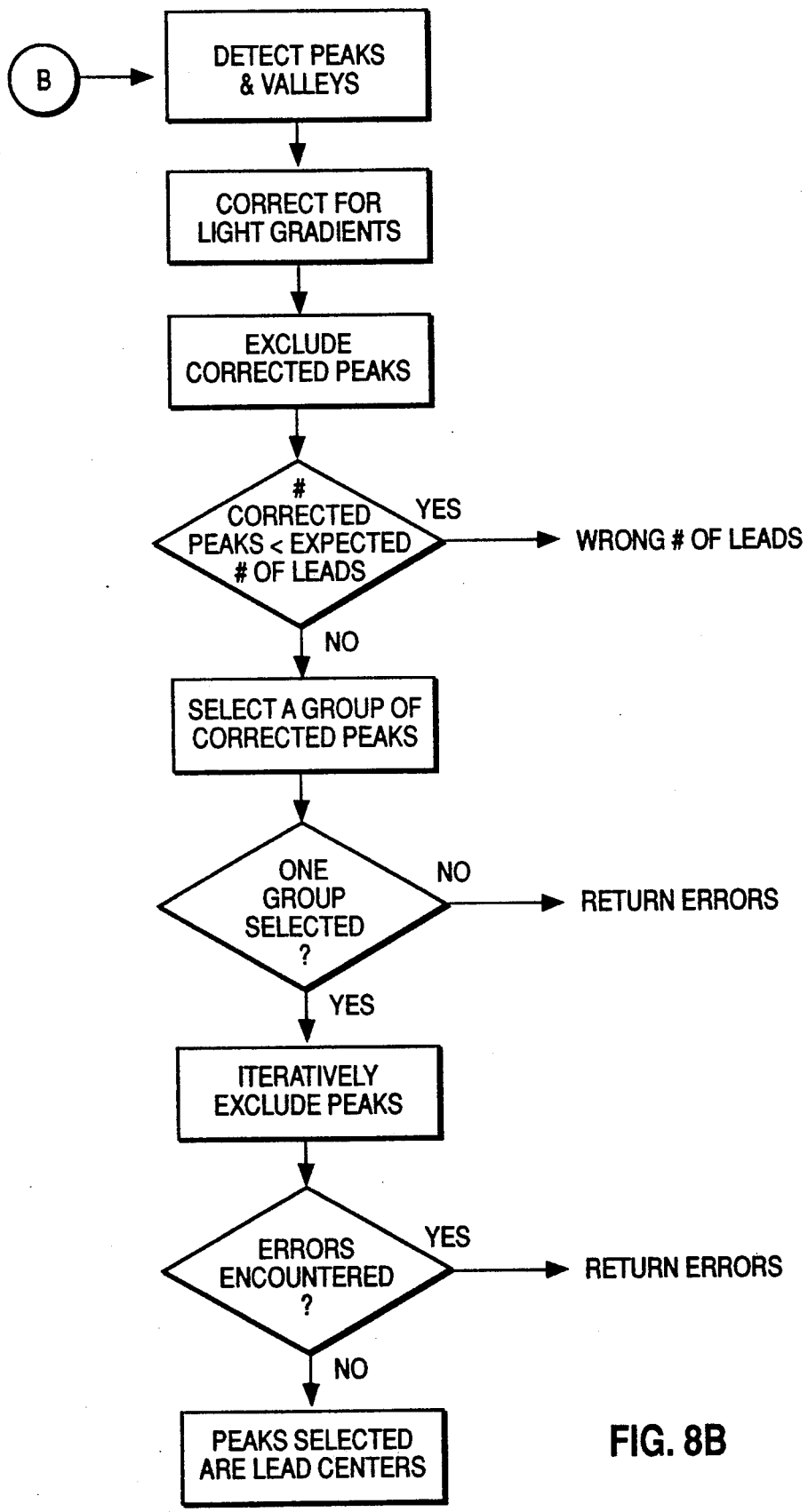

Refer now to FIG. 8 which is a flow chart of the logic followed in vision processor 20. This flow chart summarizes the process of our invention as above described having reference to FIGS. 1 through 7.

While the present invention has been described having reference to a particular preferred embodiment and a modification thereto, those having skill in the art will appreciate that the above and other modifications and changes in form and detail may be made without departing from the spirit and scope of the invention as claimed.

What is claimed is:

1. Apparatus for inspecting leaded electronic components comprising:
   means for acquiring a two dimensional array of grey level image data including two cameras and means for combining images therefrom, said means for combining including:
   means for mapping images from said two cameras to a common coordinate system;
   means for determining overlap between said images;
   means for computing to sub-pixel accuracy a centroid of a component,
   means for operating on preselected subarrays of said array of image data for forming a plurality of one dimensional summation profiles; and
   vision logic means for operating on said summation profiles.

2. A method for visually inspecting a leaded component comprising the steps of:
   capturing images of the component with a plurality of cameras;
   digitizing images so captured;
   mapping portions of said digitized images corresponding to locations where leads are expected to a single coordinate system;
   determining overlap between mapped image portions;
   finding lead centroid position to sub-pixel accuracy in each mapped image portion;
   mapping lead positions from each image to a common coordinate system;
   identifying overlapping leads; and
   calculating component position and orientation as a function of lead centroids found.

3. The method of claim 2 wherein the finding step comprises:
   developing one dimensional summation profiles corresponding to each mapped image portion;
   correlating profile peaks to individual lead centers;
   correcting profile peaks for light gradients; and
   excluding false peaks.

4. The method of claim 3 wherein said developing step comprises:
   summing gray level pixel values in rows or columns as a function of which is substantially parallel to expected lead axis.

* * * * *

UNITED STATES PATENT AND TRADEMARK OFFICE
CERTIFICATE OF CORRECTION

PATENT NO. : 5,185,811
DATED : February 9, 1993
INVENTOR(S) : G. E. Beers et al

It is certified that error appears in the above-indentified patent and that said Letters Patent is hereby corrected as shown below:

Col. 2, line 51, after "fine-pitch" insert --,--;
Col. 4, line 3, delete "controls" and insert --centroids--;
Col. 7, line 56, after "reset the peak summation" insert
   --value to vall--;
   line 58, delete "gummation" and insert --summation--;
Col. 8, line 11, delete "Distance Apart:" and insert
   --<u>Distance Apart:</u>--;
   insert new line after line 19 which reads --then--;
   line 55, delete "of the Group:" and insert --<u>of
   the Group:</u>--;
Col. 9, line 19, after "average" insert -->--; and
   line 24, before "peaks" insert --remove--.

Signed and Sealed this

Fourth Day of June, 1996

Attest:

BRUCE LEHMAN

Attesting Officer     Commissioner of Patents and Trademarks